United States Patent [19]

Onanian

[11] 3,830,560
[45] Aug. 20, 1974

[54] MICROSCOPE APPARATUS
[76] Inventor: Richard A. Onanian, 85 Irving St., Arlington, Mass. 02174
[22] Filed: June 27, 1973
[21] Appl. No.: 374,263

Related U.S. Application Data
[62] Division of Ser. No. 71,736, Sept. 14, 1970, abandoned.

[52] U.S. Cl.............. 350/238, 350/90, 350/235, 350/237, 350/245, 248/125, 248/403, 108/144
[51] Int. Cl............................................. G02b 27/02
[58] Field of Search.................. 350/9, 18, 87–90, 350/115, 122, 235–238, 245, 252, 255, 257; 108/144; 248/125, 402, 403, 405

[56] References Cited
UNITED STATES PATENTS

| | | | |
|---|---|---|---|
| 34,409 | 2/1862 | Craig | 350/238 |
| 1,418,645 | 6/1922 | Hensoldt | 350/87 |
| 1,521,339 | 12/1924 | Taylor | 350/18 |
| 1,707,351 | 4/1929 | Fiske | 350/255 |
| 1,894,639 | 1/1933 | Schlumbohm | 350/252 |
| 2,168,137 | 8/1939 | Porter | 353/39 |
| 2,497,147 | 2/1950 | Washam | 350/252 |
| 2,725,788 | 12/1955 | Pfleger | 350/235 |
| 2,855,169 | 10/1958 | Hintz | 248/125 |
| 3,360,641 | 12/1967 | Korte | 350/87 |
| 3,391,975 | 7/1968 | Annis et al | 350/255 |

FOREIGN PATENTS OR APPLICATIONS

| | | | |
|---|---|---|---|
| 973,656 | 4/1960 | Germany | 350/86 |
| 1,553,793 | 2/1954 | Great Britain | 350/90 |

Primary Examiner—Edward S. Bauer

[57] ABSTRACT

A microscope comprising an integral tubular frame mounting an eyepiece and a slide stage, and having means for adjusting the position of the stage relative to the eyepiece.

In a microscope frame, a hollow base through which the stage may be illuminated directly, and a side opening removably receiving a mirror through which the stage may be illuminated indirectly, by natural or artificial light source.

Means for both directly and reflectively illuminating the stage by artificial light source.

49 Claims, 14 Drawing Figures

INVENTOR
RICHARD A. ONANIAN
BY Chittick, Pfund, Birch, Samuels, & Gauthier
ATTORNEYS

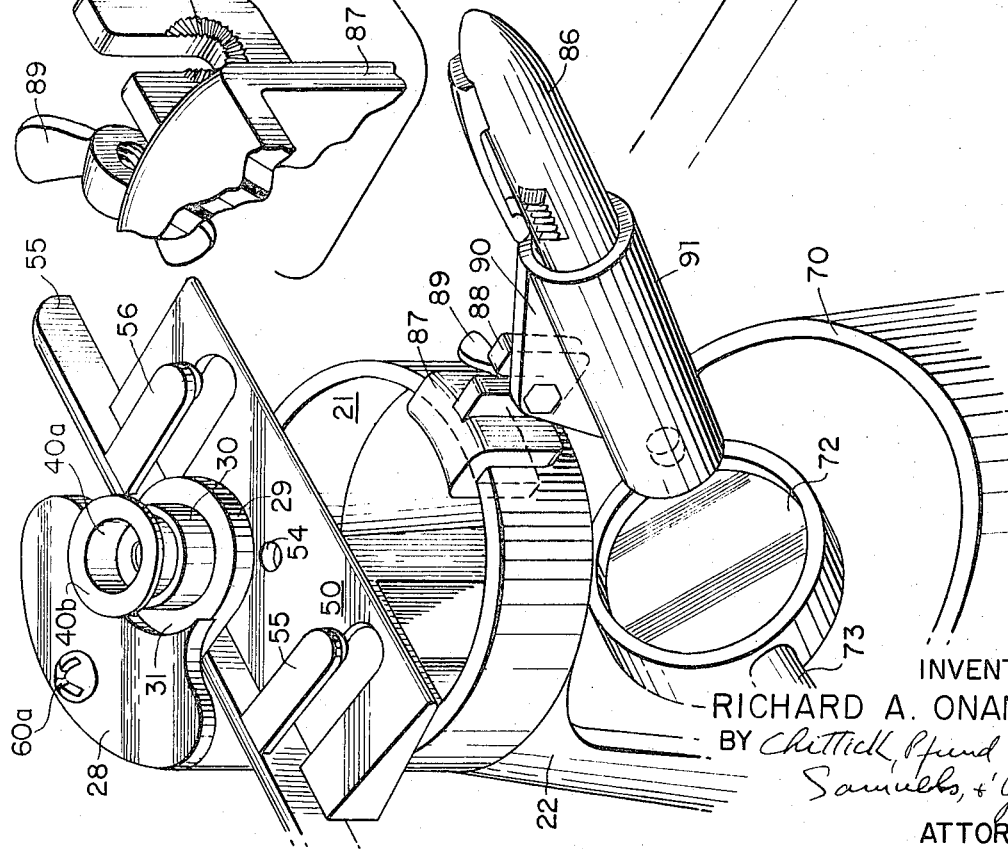

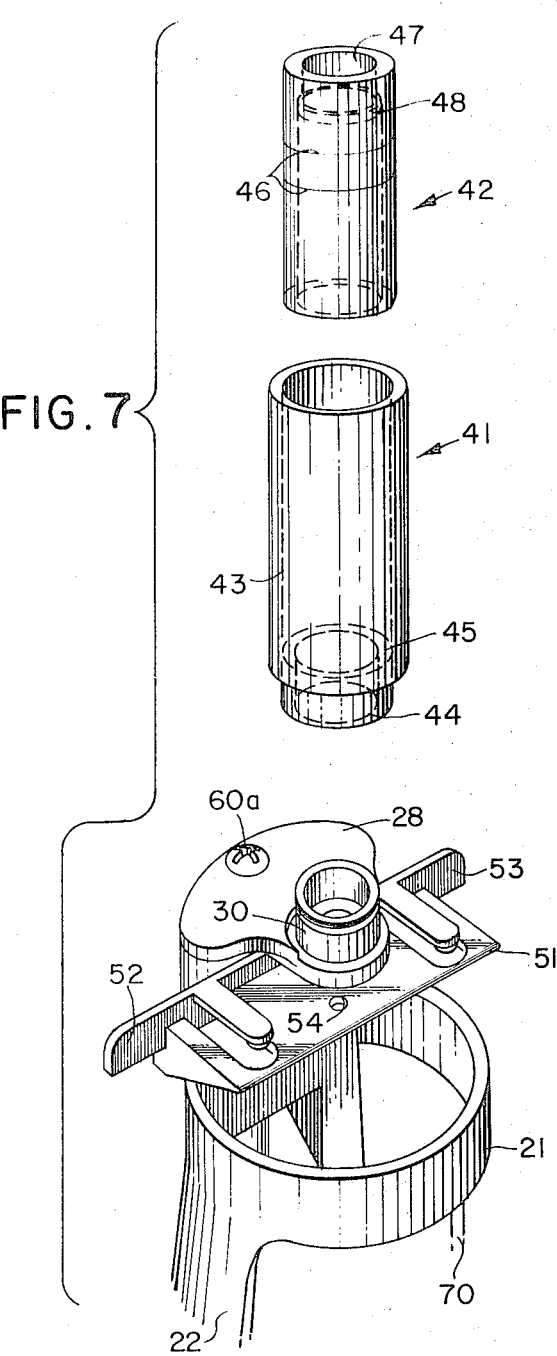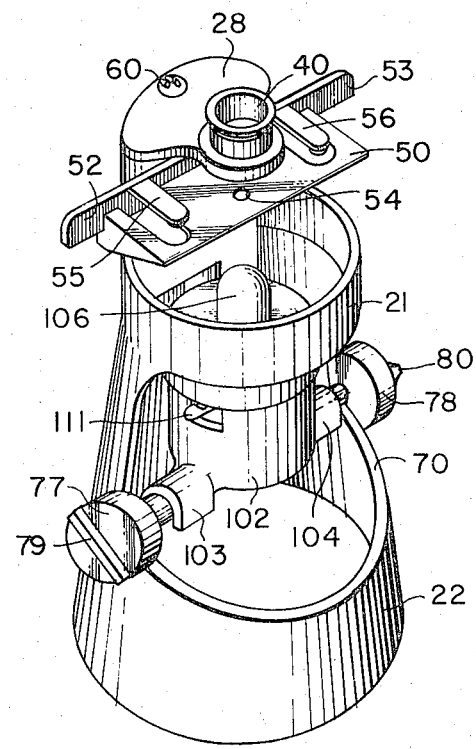

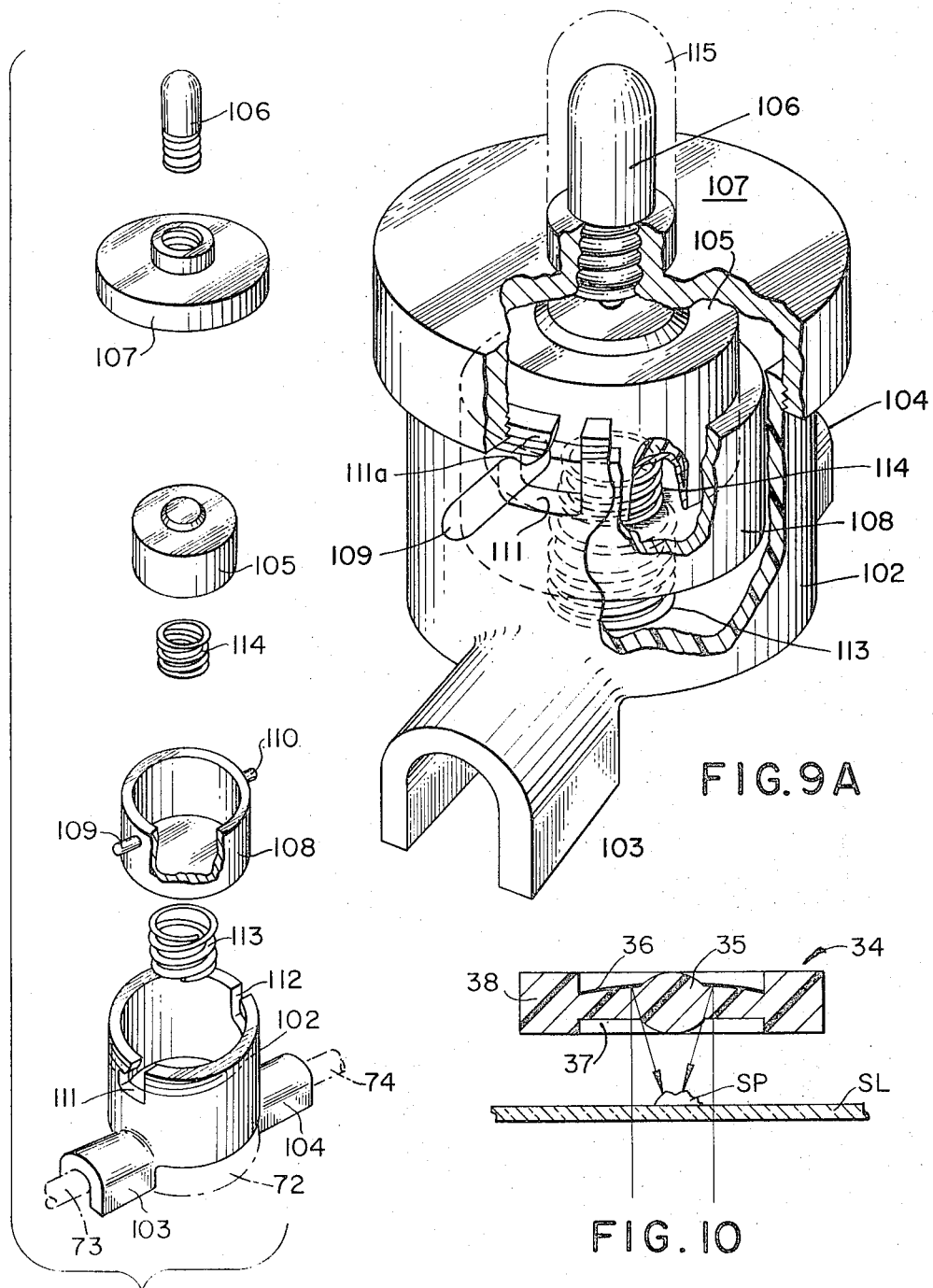

MICROSCOPE APPARATUS

This application is a division of parent application Ser. No. 71,736 filed Sept. 14, 1970 and now abandoned.

BACKGROUND OF THE INVENTION

The invention pertains to the field of microscopes, and more especially to microscopes adapted particularly for youth and educational use.

BRIEF SUMMARY OF THE INVENTION

Briefly summarized, the present invention provides a microscope:

of low cost, simple construction, and easy operation, and which is, therefore, suitable for recreational and educational use by the youth as well as the adult population;

compact in design, attractive in appearance, and durable and damage-free in use;

adapted for both direct and reflected illumination of the specimen, and by both natural and artificial light sources; and having a slide stage adjustable to varying focal lengths from the microscope lens, and without risk of injury thereby to the slide.

BRIEF DESCRIPTION OF DRAWINGS

In the accompanying drawings illustrating the invention apparatus:

FIGS. 6 and 6A detail the penlight attachment;

FIG. 7 is an exploded perspective of the compound lens;

FIG. 8 shows the microscope fitted with the self-contained artificial light source;

FIG. 9 is an exploded view of the FIG. 8 light source;

FIG. 9A is an enlarged perspective view of the light source assembly; and

FIG. 10 is an enlarged section of one lens construction.

DETAILED DESCRIPTION OF THE INVENTION

Figure 1A:
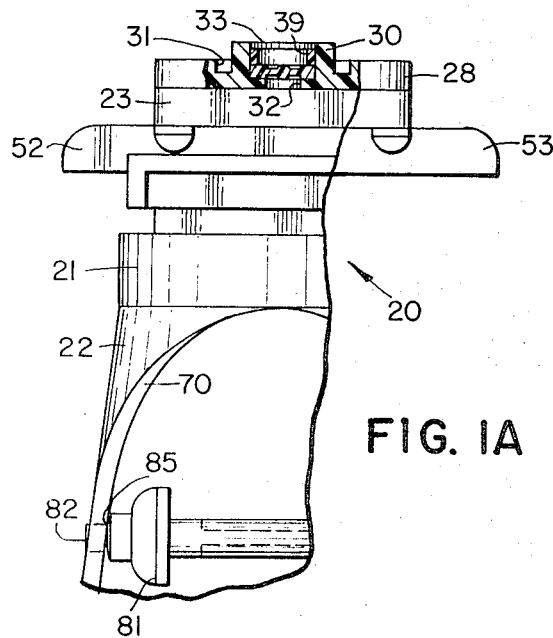
FIG. 1A is a fragmentary elevation showing a modified form of the mirror assembly.

In the preferred embodiment of the drawings, the microscope comprises a tubular frame 20 of generally solid walled, rigid, annular construction and which, as will be apparent further from the drawing as well as from the following description, is shaped and proportioned to be hand-held,-i.e., held in the hand-and manipulated by both youth and adult users, and also for orienting in relation either to natural or to artificial light source. Frame 20 has a cylindrical enclosed waist portion 21 and integrally dependent therefrom a conical base portion 22. Base portion 22 is flat bottomed as shown, or otherwise adapted, to stable support the microscope upon a flat or other suitable surface, and converges upwardly to surmounting waist portion 21 which is thereby continuous with base portion 22.

As just indicated, the described frame 20, or more particularly waist 21 and base 22, may be and are herein shown as of tubular, hollow, or interiorly passaged construction, and whereby users may aim the microscope directly at any selected, including an elevated, light source.

Figure 5:
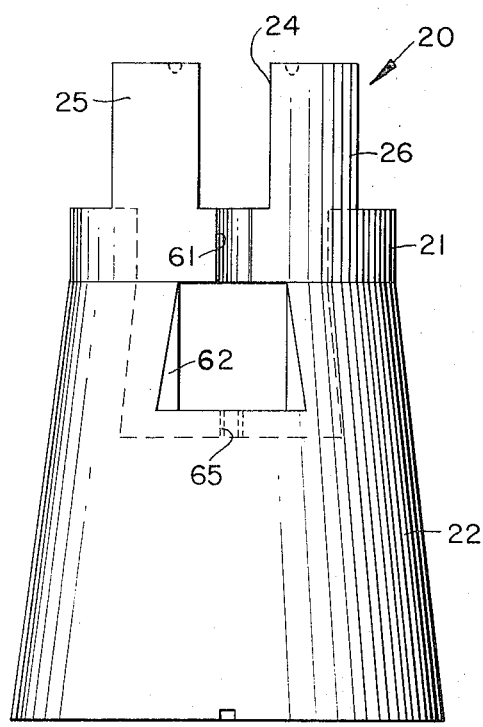

Projecting upwardly of said waist portion 21 is an integral upstanding back portion 23 which is slotted centrally to present a vertical guide slide 24, FIG. 5, extending downwardly to waist 21, and dividing the back into similar spaced ears 25, 26.

Back 23 has an annular outside or rear side continuous with waist 21, and extends or projects upwardly clear of, or so as to non-intersect, the microscope sight line, or the line or path on or along which the incident light (whether natural or artificial, and direct or reflected) passes or travels through the object or specimen to the microscope eyepiece or lens unit. More particularly, back 23 is flatted frontally as at 27, FIGS. 3 and 4, parallel to and well to the rear of a transverse diameter of the microscope body, leaving uncovered the major perimeter of the waist 21, as shown, FIGS. 3 and 4.

In the illustrated embodiment, then, the invention microscope is apertured through frame 20, or passaged along its said sight line, to expose the microscope object or specimen, or the to be described slide stage therefor, to a light source directly opposite said lens unit.

Figure 3:
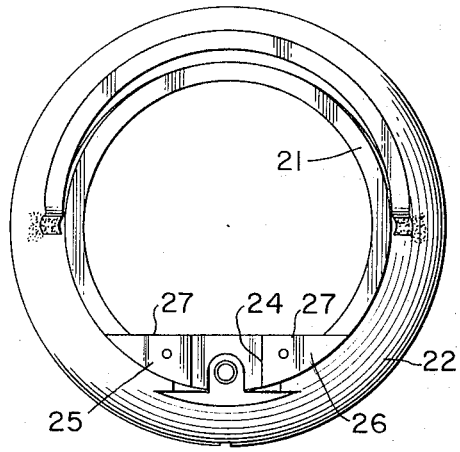
FIGS. 3, 4 and 5 are top, side and rear views of the microscope frame.
Figure 4:
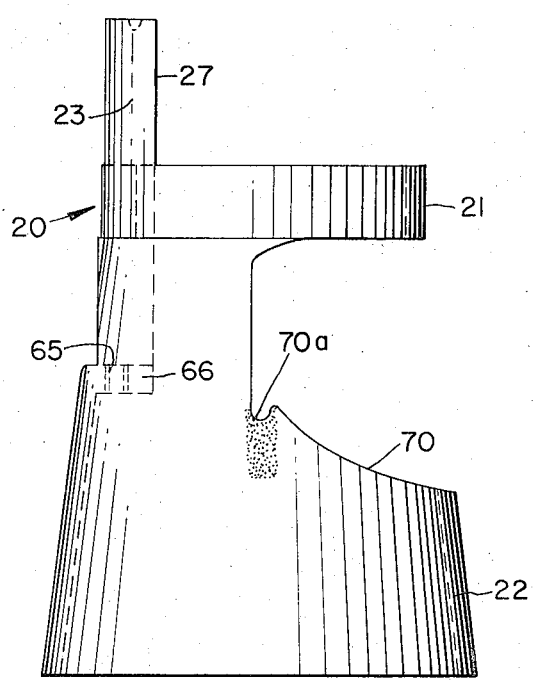

The back portion bearing slot or guide slide 24 is seen to have parallel walls, square with the flatted fronts 27 of the ears 25, 26, FIGS. 3 and 5.

Figure 1:
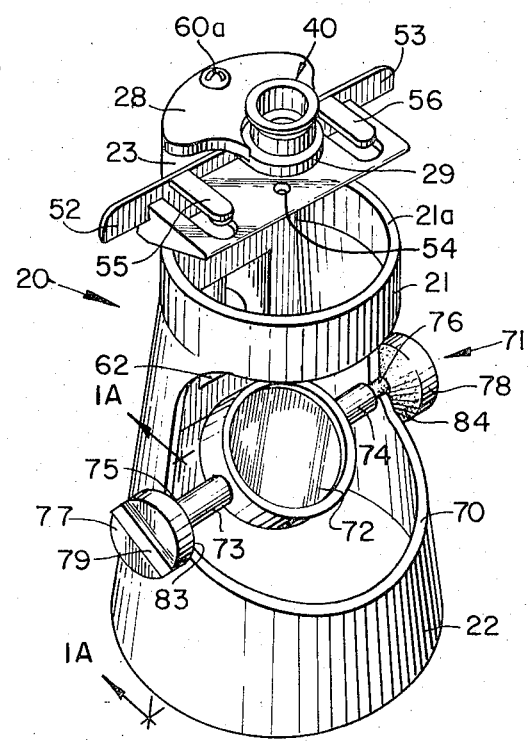
FIG. 1 is a perspective view of the microscope.
Figure 2:
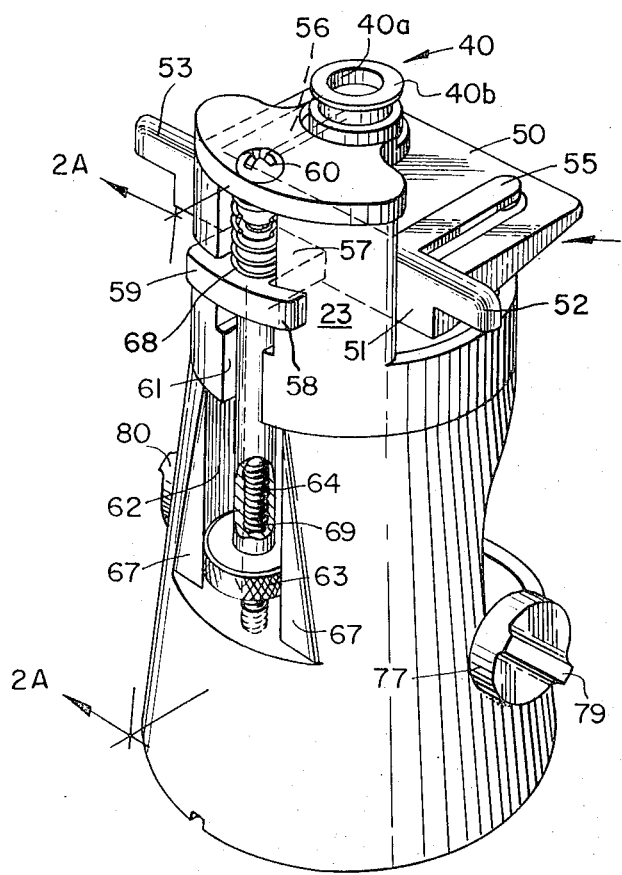
FIG. 2 is a rear perspective showing the stage positioning means.

An eyepiece 28 is mounted on back portion 23, and more particularly closes over the slide 24 with an annular rear contour whereby it is flush or continuous with the ears 25, 26 thereat, as shown, FIGS. 1 and 2. The eyepiece 28 overhangs the back 23 forwardly thereof, curving symmetrically inwardly thereat to a rounded or annular projection 29 intersecting, or extending through or across, the microscope sight line, and herein centered over cylindrical waist 21.

Projection 29 is defined as a support for a lens unit, by an annular projecting rim 30 and surrounding indenting recess 31, FIG. 1A, the rim 30 apertured vertically by a lower bore 32 and a large upper recess 33. The recess or counterbore 33 forms a receptacle for a lens element, and defines the rim 30 more particularly as a cylindrical housing for said element.

Annular, rim enclosing recess 31 steps the eyepiece projection down from the main eyepiece body to minimize obstruction of view of the slide stage, and may be of a depth to define therewithin a housing 30 projecting within the main body of the eyepiece 28.

A suitable lens assembly or unit is shown in FIGS. 1A and 10 to be carried by the eyepiece projection, engaged to the rim or housing 30, and located on the microscope sight line. The lens unit is shown more particularly to comprise an annular disc 34 of optical glass or plastic material, of a size to fit snugly within the receptacle 33. Disc 34 comprises a central, magnifying bead 35; an intermediate web recessed from both sides, and having a parabolic top surface 36 and a flat or horizontal bottom surface 37; and an outer or peripheral annular seating ring portion 38.

In accordance with the invention, the parabolic surface 36 may be inside reflectorized, whereby light from below, passing through the underlying, transparent slide SL but around a small opaque specimen, FIG. 10, may be focused on the opaque specimen SP, as shown. Alternatively within the invention, the bottom surface 37 may be reflectorized, in a flat or parabolic configuration.

The lens 34 is received in the recess 33, as shown, FIG. 1A, being seated on the shoulder defined by the smaller opening 32, and releasably retained thereagainst, in the FIG. 1A embodiment, by a ring 39 of lesser height, when seated on the lens, than the housing 30, and dimensioned for a snug or friction fit therewith, whereby the ring 39 and with it the lens 34 are relatively impervious to careless or unwanted removal from the housing.

Alternatively within the scope of the invention, the retainer may comprise a ring 40 having a cylindrical portion 40a snugly received in and of the same height as recess 33, and mounting an annular flange 40b overlying and also overhanging housing 30, whereby ring 40 comprises a lens retaining means releasably held in and having a manually manipulable portion projecting without the housing, for ready removal of the same by grasping the flange 40b.

The invention further provides, for the lens unit of the microscope, and in combination with lens 34, or with such other lens element as may be suited thereto, a compound lens system comprising an adjusting sleeve 41, FIG. 7, received over the housing 30, a compound lens tube 42 slidably interfitting said adjusting sleeve, and a lens seated in said tube 42, not shown in FIG. 7, but which, like the eyepiece-seated lens, may be of the FIG. 10 or any suitable construction.

In the illustrated embodiment, the adjusting sleeve 41 comprises more particularly a cylinder having an upper main body portion 43 enlarged from a reduced, centering and orienting lower portion or extension 44 snugly overfitting cylindrical housing 30, and adapted to seat in recess 31, as shown.

The adjustment or slidable interfitting of the compound lens tube 42 within the adjusting sleeve 41 is controlled or regulated by means for visually indicating the magnification settings of the compound lens system, said visual indicating means herein comprising the graduations 46. The compound lens system is continuously adjustable in and intermediate selected positions of alignment of the graduations 46 with the top of sleeve 41, between its position of highest and lowest magnification. Tube 42 can also be fitted, independent of sleeve 41, directly over housing 30 to provide a fixed compound magnification.

The compound lens tube 42 is provided also with a counterbore 47 defining an internal shoulder 48 for seating the compound lens, the counterbore 47 receiving also a ring or the like for retaining the lens therewithin, all similarly as with the eyepiece lens arrangement heretofore described. And for interchangeability of the lenses and retaining means, the compound lens tube counterbore 47 may be dimensioned similarly as the eyepiece lens housing bore passage 33.

Intermediate waist 21 and eyepiece 28 is a frame associated, herein integral slide stage 49 comprising a transverse rectangular platform 50 and a heel or back portion engageable against frame back 23, FIGS. 1, 2, 7, 8, and extending upwardly and outwardly of the platform to define a rear abutment or backstop for slides receivable on platform 50. The slide stage heel, back portion or abutment 51 terminates at its opposite ends in outwardly projecting ears 52, 53 that project or extend outwardly to a standard slide length, to thereby protect or guard the slide against injury, and that also project or extend upwardly, as shown, to protect or guard the operator's nose against uncomfortable, sharp edge contact, for which latter the ears may be rounded as shown.

Further to platform 50, which may be translucent, that has a centering hole or aperture 54 facilitating placing a slide specimen under the lens unit, and assuring, in whatever platform construction, light transmittal through and from below the specimen and slide, as indicated in FIG. 12, the slide being engaged and held on the platform by the overlying spring clips 55, 56, herein integrally extending forwardly from back 51, and gripping the slide sufficiently to hold the same against gravity sliding release, and in any attitude or orientation of the microscope.

Figure 2A:
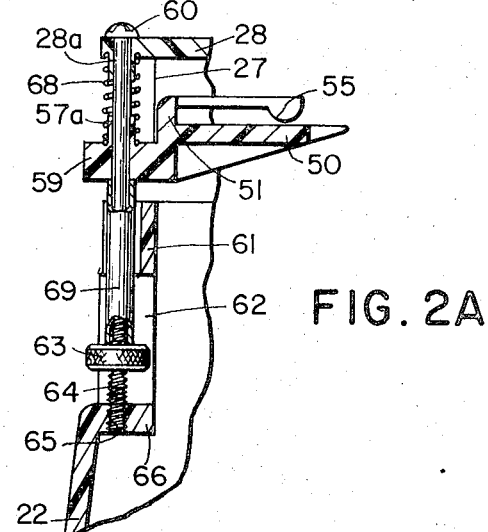
FIG. 2A is a vertical section showing the stage positioning means.

The slide stage 49 further comprises positioning neck portion 57, FIGS. 2 and 2A, integrally extending rearwardly of platform 50 and back 51, said neck portion 57 engaging the stage to the guide slide, and more particularly having a snug sliding fit in back slot 24, and terminating rearwardly in a headed portion closely overlying back 23 at both sides of slot 24, said portion being herein embodied as integral, oppositely laterally projecting ears 58, 59. Given the snug, conformant interfitting of neck 57 within bearing or guide slot 24, and of the platform 50 and ears 58, 59 adjacent thereto, or with the front and rear walls of back 23 thereat, the slide stage is seen to have biaxial support by, and more particularly to be confined to vertical sliding movement along, or within, said back slot 24.

Frame carried means are provided for effecting relative movement between the lens unit and slide stage, and more particularly for adjustably positioning stage 49 at any desired focal length between the lens unit and the microscope waist 21, said means comprising a vertically disposed, headed bolt or rod 60 mounted centrally rearwardly of the microscope and more particularly slideably received through closely fitting openings in the eyepiece 28 and slide stage neck 57, the bolt affording biaxial support of the slide stage, with a sufficiently snug sliding fit of the latter thereover.

The rod or bolt length continues in an intermediate portion downwardly through a waist slot 61 and base slot 62, the latter enlarged to receive an oppositely manually manipulable, fine adjustment means for urging or driving slide stage 49 upwardly or in one direction, and for permitting shifting of said stage downwardly or in the opposite direction, along the invention guide slide, or, more particularly, in back slot 24. Said oppositely manually manipulable, fine adjustment means herein comprises a knurled adjusting knob or thumb nut 63 turning on the threaded lower rod length 64. The threaded lower rod length 64 sufficiently extends, of course, to permit the turning of the thumb nut 63 to effect any desired focal length positioning of platform 50 between the frame base portion and the lens unit.

The rod or bolt 60 has an anchoring portion or formation, herein a threaded lower end, by which it is releasably anchored or secured to a mating, anchoring frame portion or formation, herein threaded base socket 65. Upon tightening or screwing up application of a screwdriver or other torque tool to head 60a, then, the bolt or rod 60 functions also as a tie means, or to tightly clamp or secure the eyepiece 28 against or to the back 23. Bolt 60 is thus manipulable, by screwing and unscrewing, for removably securing it to the frame, and thereby for detachably mounting the eyepiece to the frame back. To house socket 65, base 22, FIG. 2A, may be thickened or indented as at 66; and for convenient access to manipulating knob 63, the base may be back-recessed or vertically flatted, as at 67, FIG. 2, to an extent sufficiently or partially exposing the knob 63 for its said opposite manual manipulating.

The frame carried, slide stage positioning means further comprise resilient means for biasing the slide stage downwardly, or towards or in opposition to knob 63, said means herein embodied as spring 68 compressed on rod 60 between eyepiece 28 and slide stage neck 57. Under the invention, suitable means, herein the bosses 28a, 57a, FIG. 2A, are provided also for both seating the spring ends and limit-stopping the upward movement of the slide stage, prior to and hence forestalling the otherwise potentially damaging engagement of the stage back 51 against the underside of eyepiece projection 29. The limit-stopping is also of stage 50 to a spacing from eyepiece 28 not less than the thickness of a specimen bearing slide, the collapsed length of spring 68 being made less than such spacing.

The downward sliding movement of neck 57 on rod 60 is permitted, and the return or upward movement of the slide stage thereon is caused, by appropriate, clockwise-counterclockwise rotation of thumb nut 63, whose vertical movement is transmitted to the slide stage by a riser, or spacer tube sleeve, 69 received on rod 60 and spanning or engaging between the thumb nut 63 and the underside of slide stage neck 57, and thereby limiting the downward movement of the stage under biasing by spring 68.

In accordance with the invention, the microscope has a side opening extending into the microscope sight line and through to the slide stage, herein embodied as the hollow construction of the waist 21 and base 22; or the recessing 70 of the base 22 laterally inward to or beyond the transverse base diameter, and vertically downward from the waist 21 for a distance admitting side-entry therewithin of the parts to be described, and therewith the recessing of the frame along said sight line vertically upward from said laterally inward recessing through the waist to a frame top opening.

A mirror assembly 71 is rotatably supported in the frame 20 and orientable to reflect light admitted through said opening 70 to illuminate slides received on stage 49. In the FIG. 1 embodiment, the mirror assembly comprises more particularly a round and plane or concave mirror proper 72 supported from annular, oppositely projecting axles 73, 74 having reduced neck portions 75, 76 rotatably received in bearing formations, or opposite annular recess notches 70a, FIGS. 1 and 4, and terminating in manually manipulable adjusting knobs 77, 78, which may have mirror-angle-signalling, transverse rib or key formations 79, 80. In the preferred, FIG. 1A embodiment, the adjusting knobs are located within the base, as at 81, interiorly of the reduced axle portion 82 removably-rotatably received in the recess 70.

In accordance with the invention, means are provided for damping the movement of the mirror assembly 71, for more accurate control of the mirror orientation or attitude particularly by young users, and to prevent jarring or inadvertent moving of the mirror assembly from desired or adjusted position. In the FIG. 1 form, the same is accomplished by providing the adjusting knobs 77, 78 with bearing faces 83, 84, having substantially the conicity of frame base 22, and a spacing predeterminedly such as to frictionally engage and more particularly pressure inwardly the frame, or the opposite walls of said base 22, thereat. The damping action, or frictional engagement, may be further enhanced by roughing of either or both the engaged knob bearing and frame base surfaces, as shown, FIGS. 1 and 4.

In the FIG. 1A form, the damping means is provided by shoulders or stems 85 bearing against the inside of the frame base 22, and spaced to pressure the opposite frame walls outwardly thereat. The stems 85 may also have the conicity of the base 22, and with that be roughened similarly as described for the FIG. 1 form.

In use the microscope may be supported on the laboratory table with the opening 70 turned to face the window, or so as to enable mirror 72 to reflect the maximum amount of natural light, upwardly through platform aperture 54 (at least) to the slide specimen. Also, the microscope may be manually held at eye height with the mirror assembly removed and aimed at a natural or artificial light source for direct admittance of light.

Alternatively, the specimen may be artificially illuminated, by means employed in combination or association with the mirror assembly 71, and comprising, for example, a pen light 86, FIG. 6, for which may be provided removable, angularly adjustable frame support means. As herein embodied, said means comprises a U-bracket 87 fitting over the edge of waist 21, and mounting a tongue 88 notched to receive a bolt and nut fastening 89 carried by a flange 90 of a pen light receiving tube 91. For releasably securing the light source of pen light 86 in different desired positions of angular adjustment, or more particularly of directing the light source at mirror assembly 71, the tightening of the nut and bolt fastening 89 may engage splining, or mating radial, rib and groove formations 88a, 90a, FIG. 6A, on the thereby clamped together faces of tongue 88 and rib 90.

The invention microscope apparatus further comprises self-powered means supported within the frame for artificially illuminating the slide stage and herein illustrated in FIGS. 8, 9 and 9A. The illuminating means, as herein embodied, comprises a non-conductive, cup-shaped battery housing 102 that seats on mirror 72 and is stabilized by conformant lugs or bearings 103, 104 received on mirror axles 73, 74, defining transverse pivot bearings or trunnions, and enabling the angular positioning of the artificial illuminating means by adjustment of the knobs 77, 78. Housing 102 receives a battery 105 contacting a bulb 106 threaded into a conductive cover 107 screwed in turn onto housing 102.

In accordance with the invention, switch means are provided that are finger-tip manipulable to make-break the circuit between battery 105 and cover 107, to illuminate or not the bulb 106, and comprising a conductive can 108 nested with and intermediate or interposed between housing 102 and battery 105. Can 108 has radially projecting manipulating pins 109, 110 received in dog-leg, rim notches 111, 112 in housing 102, and normally seated in, or pressed into, the undercuts thereof, as indicated at 111a, FIG. 9A, out of contact with cover 107, by the coil spring 113 compressed between the underside of can 108 and the inside of housing 102.

To actuate, then, the bulb 106, the pins 109, 110 are manually depressed from the notch-undercut-seated, "off" position of FIG. 9A and rotated to the vertical branches of the notches 111, 112 wherein the action of spring 113 is now to bias can 108 upwardly to contactive or circuit-making engagement of pins 109, 110, with the rim of cover 105. A conductive coil spring 114 may also be placed or compressed between switch can 108 and battery 105, to insure conductive contact of the latter with bulb 106, which in turn may be protectively housed in a transparent cover 115.

I claim:

1. In a microscope of the class described, suitable for recreational and educational use by the youth as well as the adult population, in combination,
   a compact, lightweight, unitary frame, said frame comprising
   a supporting base portion and
   an integral back portion projecting upwardly of said base portion and clear of the microscope sight line;

a vertical guide slide formed on said frame back portion;
   a slide stage, said slide stage comprising
   a transverse platform,
   means for engaging and holding specimen slides on said platform, and
   means engaging said slide stage to said guide slide for vertical sliding movement of said slide stage along said guide slide;
   an eyepiece mounted on said frame back portion, said eyepiece having
   a projection overhanging forwardly of said frame back portion and extending across said sight line;

a lens unit carried by said eyepiece projection and located on said sight line; and
   means associated with said frame and engaging said vertical sliding slide stage for positioning said platform at any desired focal length between said lens unit and said frame base portion, said platform positioning means comprising
   fine adjustment means oppositely manually manipulable to urge and permit shifting of said slide stage in one and the opposite direction along said guide slide, and
   resilient means engaged between said slide stage and said frame and biasing said slide stage in opposition to said fine adjustment means.

2. In a microscope of the class described, suitable for recreational and educational use by the youth as well as the adult population, in combination,
   a compact, lightweight, unitary frame, said frame comprising
   a supporting base portion and
   an integral back portion projecting upwardly of said base portion and clear of the microscope sight line;

a vertical guide slide formed on said frame back portion;
   a slide stage, said slide stage comprising
   a transverse platform,
   means for engaging and holding specimen slides on said platform, and
   means engaging said slide stage to said guide slide for vertical sliding movement of said slide stage along said guide slide;
   an eyepiece mounted on said frame back portion, said eyepiece having
   a projection overhanging forwardly of said frame back portion and extending across said sight line;

a lens unit carried by said eyepiece projection and located on said sight line; and
   means associated with said frame and engaging said vertically sliding slide stage for positioning said platform at any desired focal length between said lens unit and said frame base portion, said platform positioning means comprising
   screw adjustment means manually rotatable to urge and permit shifting of said slide stage in one and the opposite direction along said guide slide, and
   resilient means engaged between said slide stage and said frame and biasing said slide stage in opposition to said screw adjustment means.

3. In a microscope of the class described, suitable for recreational and educational use by the youth as well as the adult population, in combination,
   a compact, lightweight, unitary frame, said frame comprising
   a supporting base portion and
   an integral back portion projecting upwardly of said base portion and clear of the microscope sight line;

a vertical guide slide formed on said frame back portion;
   a slide stage, said slide stage comprising
   a transverse platform,
   means for engaging and holding specimen slides on said platform, and
   means engaging said slide stage to said guide slide for vertical sliding movement of said slide stage along said guide slide;
   an eyepiece mounted on said frame back portion, said eyepiece having
   a projection overhanging forwardly of said frame back portion and extending across said sight line;

means for detachably securing said eyepiece to said frame back portion, said detachably securing means comprising
   a headed bolt passed through said eyepiece and received in said frame, and
   mating formations on said bolt and frame whereby said bolt is releasably anchored in said frame;
   a lens unit carried by said eyepiece projection and located on said sight line; and
   means associated with said frame and engaging said vertically sliding slide stage for positioning said platform at any desired focal length between said lens unit and said frame base portion, said platform positioning means comprising
   fine adjustment means oppositely manually manipulable to urge and permit shifting of said slide stage in one and the opposite direction along said guide slide, and
   resilient means engaged between said slide stage and said frame and biasing said slide stage in opposition to said fine adjustment means.

4. In a microscope of the class described, suitable for recreational and educational use by the youth as well as the adult population, in combination,
   a compact, lightweight unitary frame of generally solid walled, hollow, annular construction and comprising
   a supporting base portion;
   a generally cylindrical waist portion continuous with said base portion,
   said waist portion being somewhat smaller, in outside dimension, than said base portion;
   an integral back portion projecting upwardly of said waist portion and clear of the microscope sight line;
   a vertical guide slide formed on said frame back portion;
   a slide stage, said slide stage comprising
   a transverse platform,
   means for engaging and holding specimen slides on said platform, and
   means engaging said slide stage to said guide slide for vertical sliding movement of said slide stage along said guide slide;
   an eyepiece mounted on said frame back portion, said eyepiece having
   a projection overhanging forwardly of said frame back portion and extending across said sight line;
   a lens unit carried by said eyepiece projection and located on said sight line; and
   means associated with said frame and engaging said vertically sliding slide stage for positioning said platform at any desired focal length between said lens unit and said frame base portion, said platform positioning means comprising
   fine adjustment means oppositely manually manipulable to urge and permit shifting of said slide stage in one and the opposite direction along said guide slide, and
   resilient means engaged between said slide stage and said frame and biasing said slide stage in opposition to said fine adjustment means.

5. In a microscope of the class described, suitable for recreational and educational use by the youth as well as the adult population, in combination,
   a compact, lightweight, unitary frame, said frame comprising
   a supporting base portion and
   an integral back portion projecting upwardly of said base portion and clear of the microscope sight line;
   a vertical bearing slot in said frame back portion;
   a slide stage, said slide stage comprising
   a transverse platform,
   means for engaging and holding specimen slides on said platform, and
   means engaging said slide stage to said frame back portion for vertical slding movement of said stage in said slot,
   said engaging means and slide stage conformantly interfitting said frame back portion within and adjacent, and for biaxial support of said stage by, said bearing slot;
   an eyepiece mounted on said frame back portion, said eyepiece having
   a projection overhanging forwardly of said frame back portion and extending across said sight line;
   a lens unit carried by said eyepiece projection and located on said sight line; and
   means associated with said frame and engaging said vertically sliding slide stage for positioning said platform at any desired focal length between said lens unit and said frame base portion, said platform positioning means comprising
   fine adjustment means oppositely manually manipulable to urge and permit shifting of said slide stage in one and the opposite direction along said guide slide, and
   resilient means engaged between said slide stage and said frame and biasing said slide stage in opposition to said fine adjustment means.

6. In a microscope of the class described, suitable for recreational and educational use by the youth as well as the adult population, in combination,
   a compact, lightweight, unitary frame, said frame comprising
   a supporting base portion and
   an integral back portion projecting upwardly of said base portion and clear of the microscope sight line;
   a vertical guide slide formed on said frame back portion;
   a slide stage, said slide stage comprising
   a transverse platform,
   means for engaging and holding specimen slides on said platform, and
   means engaging said slide stage to said guide slide for vertical sliding movement of said slide stage along, and for biaxial support of said slide stage by, said guide slide;
   an eyepiece on said frame back portion, said eyepiece having
   a projection overhanging forwardly of said frame back portion and extending across said sight line;
   means for detachably securing said eyepiece to said frame back portion, said detachably securing means comprising
   a headed bolt passed through said eyepiece and received in said frame, and
   mating formations on said bolt and frame whereby said bolt is releasably anchored in said frame;
   a lens unit carried by said eyepiece projection and located on said sight line; and
   means associated with said frame and engaging said vertically sliding slide stage for positioning said platform at any desired focal length between said lens unit and said frame base portion, said platform positioning means comprising
   fine adjustment means oppositely manually manipulable to urge and permit shifting of said slide stage in one and the opposite direction along said guide slide, and
   resilient means engaged between said slide stage and said frame and biasing said slide stage in opposition to said fine adjustment means.

7. In a microscope of the class described, suitable for recreational and educational use by the youth as well as the adult population,
   a compact, lightweight unitary frame, said frame comprising a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion; said eyepiece having
a projection overhanging forwardly of said frame back portion and extending across said sight line;

a lens unit carried by said eyepiece projection and located on said sight line; and
means associated with said frame and engaging said vertically sliding slide stage for positioning said platform at any desired focal length between said lens unit and said frame base portion, said platform positioning means comprising
resilient means stressed between said slide stage and said frame to bias said slide stage in one direction along said guide slide, and
fine adjustment means manually manipulable for driving said slide stage in the opposite direction along said guide slide, said fine adjustment means comprising
a thumb nut at least partially exposed for said manual manipulating, and
a rod through said thumb nut and secured in said frame, said rod threaded matingly to said thumb nut over the length thereof required for the turning of said thumb nut to effect said any focal length positioning of said platform.

8. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion, said eyepiece having
a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising
resilient means stressed between said slide stage and said frame to bias said slide stage in one direction along said guide slide, and
fine adjustment means manually manipulable for driving said slide stage in the opposite direction along said guide slide, said fine adjustment means comprising
an internally threaded thumb nut,
a mating, at least partially threaded rod slidably receiving said slide stage and mounting said thumb nut in push driving relation to said slide stage, and a spacer tube slidingly received over said rod and engaged between said slide stage and said thumb nut.

9. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece having a portion fitting said frame back portion, said eyepiece further having
a projection overhanging forwardly of said frame back portion and extending across said sight line;

a lens unit carried by said eyepiece projection and located on said sight line;
tie means extending from said fitting eyepiece portion to an anchoring frame portion,
said tie means manipulable for removably securing it to said anchoring frame portion, and thereby for detachably mounting said eyepiece on said frame back portion; and
means engaging said vertically sliding slide stage for positioning said platform at any desired focal length between said lens unit and said frame base portion, said platform positioning means comprising
fine adjustment means carried on said tie means and oppositely manipulable to urge and permit shifting of said slide stage in one and the opposite direction, and
resilient means engaged between said slide stage and said frame and biasing said slide stage in opposition to said fine adjustment means.

10. In a microscope of the class described, suitable for recreational and educational use by the youth as well as the adult population, in combination, a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along said guide slide;
an eyepiece having a portion fitting said frame back portion, said eyepiece further having
a projection overhanging forwardly of said frame back portion and extending across said sight line;

a lens unit carried by said eyepiece projection and located on said sight line;
a bolt through said fitting eyepiece portion, within said vertical guide slide, through and for biaxial support of said slide stage, and into said frame,
said bolt manipulable for removably securing it to said frame and thereby for detachably mounting said eyepiece on said frame back portion; and
means associated with said frame and engaging said vertically sliding slide stage for positioning said platform at any desired focal length between said lens unit and said frame base portion, said platform positioning means comprising
a thumb nut threaded on said bolt and oppositely manually manipulable to urge and permit shifting of said slide stage in one and the opposite direction along said guide slide, and
resilient means engaged between said slide stage and said frame and biasing said slide stage in opposition to said thumb nut.

11. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said stage to said guide slide for vertical sliding movement of said slide stage along said guide slide;
an eyepiece having a portion fitting said frame back portion, said eyepiece further having
a projection overhanging forwardly of said frame back portion and extending across said sight line;

a lens unit carried by said eyepiece projection and located on said sight line;
a bolt through said fitting eyepiece portion, within sad vertical guide slide, through said slide stage, and into said frame,
said bolt manipulable for removably securing it to said frame and thereby for detachably mounting said fitting eyepiece portion on said frame back portion; and
means associated with said frame and engaging said vertically sliding slide stage for positioning said platform at any desired focal length between said lens unit and said frame base portion, said platform positioning means comprising
a thumb nut threaded on said bolt and oppositely manually manipulable to urge and permit shifting of said slide stage upwardly and downwardly, and spring means compressed between said slide stage and said eyepiece to bias said slide stage downwardly.

12. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along said guide slide;
an eyepiece having a portion fitting said frame back portion, said eyepiece further having
a projection overhanging forwardly of said frame back portion and extending across said sight line;

a lens unit carried by said eyepiece projection and located on said sight line;
a bolt through said fitting eyepiece portion, within said vertical guide slide, through said slide stage, and into said frame,
said bolt manipulable for removably securing it to said frame and thereby for detachably mounting said fitting eyepiece portion on said frame back portion; and
means associated with said frame and engaging said vertically sliding slide stage for positioning said platform at any desired focal length between said lens unit and said frame base portion, said platform positioning means comprising
a thumb nut threaded on said bolt and oppositely manipulable to urge and permit shifting of said slide stage upwardly and downwardly,
said frame apertured below said guide slide to receive said thumb nut and to partially expose that for its said opposite manual manipulating,
spring means compressed between said slide stage and said eyepiece to bias said slide downwardly, and
a spacer sleeve on said bolt between said thumb nut and said slide stage, said spacer sleeve supporting said slide stage against its downward biasing by said compressed spring means, and positioning said platform by said manipulation of said thumb nut.

13. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, a heel extending upwardly of, and defining a back stop for slides received on, said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

14. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, oppositely extending ears at the back of said platform, said ears extending outwardly to protect a slide of standard length and upwardly to function also as a nose guard, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

15. In a microscope of the class described, suitable for recreational and educational use by the youth as well as the adult population, in combination, a compact, lightweight, unitary frame, said frame comprising a supporting base portion, said supporting base portion interiorly through passaged along the microscope sight line, and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

16. In a microscope of the class described, suitable for recreational and educational use by the youth as well as the adult population, in combination, a compact, lightweight, unitary frame, said frame comprising a supporting base portion, said base portion having a side opening extending into the microscope sight line;

a mirror assembly rotatably supported in said side opening;

said base portion further having a top opening intersecting said side opening and whereby said mirror assembly in orientable to reflect light admitted through said side opening upwardly along said sight line;

an integral frame back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

17. In a microscope of the class described, suitable for recreational and educational use by the youth as well as the adult population, in combination, a compact, lightweight, unitary frame, said frame comprising a hollow, supporting base portion, said base portion having a side opening;

a mirror assembly positioned in said side opening, said mirror assembly comprising a mirror, and axle formations mounting said mirror, said axle formations rotatably engaging in and also releasable from said side opening, said axle formations also press fitting said frame base portion, whereby said mirror assembly is both damped in its rotation in, and held against fall out from, said frame, and in any orientation of said microscope;

an integral frame back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

18. In a microscope of the class described, suitable for recreational and educational use by the youth as well as the adult population, in combination, a compact, lightweight, unitary frame, said frame comprising a hollow, supporting base portion, said base portion having a side opening;

a mirror assembly positioned in said side opening, said mirror assembly comprising a mirror, axle formations mounting said mirror, said axle formations rotatably engaging in and also releasable from said base portion side opening, and shoulders on said axle formations, said axle formation shoulders arranged to press fit said frame base portion upon the positioning of said mirror assembly in said side opening, whereby said mirror assembly is both damped in its rotation in, and held against fall out from, said frame, and in any orientation of said microscope;

an integral frame back portion projecting upwardly of said ase portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

19. In a microscope of the class described, suitable for recreational and educational use by the youth as well as the adult population, in combination, a compact, lightweight, unitary frame, said frame comprising a hollow, supporting base portion, said base portion having a side opening;

opposite, annular, bearing notches in said side opening;

a mirror assembly positioned in said side opening, and comprising annular axle formations closely fitting in said bearing notches, said axle formations also press fitting said frame base portion about said opposite bearing notches, whereby said mirror assembly is both damped in its rotation in, and held against fall out from, said frame, and in any orientation of said microscope;

an integral frame back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjutment means oppositely manually manipulable to urge and permit shifting of said slide stage in one and the opposite direction along said guide slide, and resilient means engaged between said slide stage and said frame and biasing said slide stage in opposition to said fine adjustment means.

20. In a microscope of the class described, suitable for recreational and educational use by the youth as well as the adult population, in combination, a compact, lightweight, unitary frame, said frame comprising a hollow, supporting base portion, said base portion having a side opening;

notch bearings in the opposite walls of said hollow base portion at said side opening therein;

a mirror assembly in said side opening, said mirror assembly comprising axles closely fitting in said notch bearings, and shoulders on said axles, said shoulders frictionally engaging said opposite base portion walls, whereby said mirror assembly is both damped in its rotation in, and held against fall out from, said frame, and in any orientation of said microscope;

an integral frame back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

21. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at different desired focal lengths between said lens unit and said frame base portion, said platform positioning means comprising spring means compressed between said slide stage and said eyepiece to bias said slide stage downwardly, manually manipulable means for driving said slide stage upwardly, and means for limiting the upward movement of said slide stage by said manually manipulable means to a spacing from said eyepiece not less than the thickness of a specimen bearing slide.

22. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide, for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at different desired focal lengths between said lens unit and said frame base portion, said platform positioning means comprising spring means compressed between said slide stage and said eyepiece to bias said slide stage downwardly, manually manipulable means for driving said slide stage upwardly, and means for limiting the upward movement of said slide stage by said manually manipulable means to a spacing from said eyepiece not less than the thickness of a specimen bearing slide, said upward movement limiting means comprising bosses on said stage and eyepiece.

23. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projecting and located on said sight line; and means associated with said frame and engaging said vertically sliding slide stage for positioning said platform at different desired focal lengths between said lens unit and said frame base portion, said platform positioning means comprising spring means compressed between said slide stage and said eyepiece to bias said slide stage downwardly, manually manipulable means for driving said slide stage upwardly, and means for limiting the upward movement of said slide stage by said manually manipulable means to a spacing from said eyepiece not less than the thickness of a specimen bearing slide, said upward movement limiting means comprising bosses on said stage and eyepiece, said bosses receiving the opposite ends of said spring means.

24. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at different desired focal lengths between said lens unit and said frame base portion, said platform positioning means comprising spring means compressed between said slide stage and said eyepiece to bias said slide stage downwardly, manually manipulable means for driving said slide stage upwardly, and means for limiting the upward movement of said slide stage by said manually manipulable means to a spacing from said eyepiece not less than the thickness of a specimen bearing slide, and the fully collapsed length of said spring means being less than said spacing.

25. In a microscope of the class described, suitable for recreational and educational use by the youth as well as the adult population, in combination, a compact, lightweight, unitary frame, said frame comprising a hollow, supporting base portion, said base portion having a side opening;

a mirror assembly rotatably engaged in said side opening, said mirror assembly comprising an adjusting knob manually manipulable from without said frame, and means on said adjusting knob for indicating the orientation of said mirror assembly;

an integral frame back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

26. In a microscope of the class described, suitable for recreational and educational use by the youth as well as the adult population, in combination, a compact, lightweight, unitary frame, said frame comprising a hollow, supporting base portion, said base portion having a side opening;

a mirror assembly rotatably engaged in said side opening, said mirror assembly comprising an adjusting knob manually manipulable from without said frame, and a raised rib on said adjusting knob for indicating the orientation of said mirror assembly;

an integral frame back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

27. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens housing on said eyepiece projection and located on said sight line;

a lens unit carried by said eyepiece projection, said lens unit comprising
a lens received in said housing,
an adjusting sleeve received over said housing,
a compound lens tube slidably interfitting said adjusting sleeve, and
a lens seated in said tube; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

28. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion, said eyepiece having
a projection overhanging forwardly of said frame back portion and extending across said sight line;

a lens housing on said eyepiece projection and located on said sight line;
a lens unit carried by said eyepiece projection, said lens unit comprising
a lens received in said housing, and
a retaining ring removably received in said housing and over said lens; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

29. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion;
a lens housing on said eyepiece;
a lens unit carried by said eyepiece, said lens unit comprising
a lens received in said housing and comprising
a magnifying section and surrounding that a reflecting section, and
means removably received in said housing over and retaining said lens; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

30. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion;
a lens housing on said eyepiece;
a lens unit comprising
a lens, said lens received in said housing and comprising
a magnifying section and surrounding that a reflecting section,
said reflecting section being parabolic, and
means removably received in said housing over and retaining said lens; and
means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

31. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion;

a lens housing on said eyepiece;

a lens unit comprising a lens, said lens received in said housing and comprising a magnifying section and surrounding that a reflecting section, said reflecting section being reflectorized at its bottom surface, and means removably received in said housing over and retaining said lens; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

32. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion;

a lens housing on said eyepiece;

a lens unit comprising a lens, said lens received in said housing and comprising a magnifying section and surrounding that a reflecting section, said reflecting section being reflectorized at its top surface, and means removably received in said housing over and retaining said lens; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

33. In a microscope of the class described, suitable for recreational and educational use by the youth as well as the adult population, in combination, a compact, lightweight, unitary frame, said frame comprising a supporting base portion an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection, said lens unit comprising a parabolic reflective surface facing said slide stage; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

34. In a microscope of the class described, suitable for recreational and educational use by the youth as well as the adult population, in combination, a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion, said eyepiece having
a projection overhanging forwardly of said frame back portion and extending across said sight line;

a lens housing on said eyepiece projection;
a lens unit, said lens unit comprising
a lens recieved in said lens housing,
an adjusting sleeve received on said lens housing and having a lower portion snugly overfitting the housing and an upper portion enlarged from said lower portion,
a compound lens tube, said lens tube slidably interfitting said adjusting sleeve, received in said upper adjusting sleeve portion, and formed with a lens-seating recess dimensioned similarly as and for lens interchangeability with said lens housing, and
means removably received in said housing over and retaining said lens; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

35. In a microscope of the class described, suitable for recreational and educational use by the youth as well as the adult population, in combination, a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion;
a lens housing on said eyepiece;
a lens unit, said lens unit comprising
a lens received in said lens housing,
a compound lens tube engaged over said lens housing, and
a lens received in said tube; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

36. In a microscope of the class described, suitable for recreational and educational use by the youth as well as the adult population, in combination, a compact, lightweight unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
an eyepiece mounted on said frame back portion, said eyepiece having
a projection overhanging forwardly of said frame back portion and extending across said sight line, said projection having
a central top recess defining therewithin a lens unit housing;
a lens unit engaged to said housing; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

37. In a microscope of the class described, suitable for recreational and educational use by the youth as well as the adult population, in combination, a compact, lightweight, unitary frame, said frame comprising
a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line, said projection having a central top recess stepping said eyepiece projection down from the main eyepiece body to minimize obstruction of view of said slide stage, and a central top rim formed within said recess, said rim projecting within the thickness of said main eyepiece body;

a lens unit engaged to said rim; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

38. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

said frame having a side opening;

a mirror assembly rotatably supported in said frame;

said frame further apertured whereby said mirror assembly is orientable to reflect light passing through said side opening so as to illuminate slides received on said stage;

a pen light source associated with said frame and directed at said mirror assembly;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

39. In a microscope of the class described, suitable for recreational and educational use by the youth as well as the adult population, in combination, a compact, lightweight, unitary frame, said frame comprising a supporting base portion an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

an eyepiece mounted on said frame back portion, said eyepiece having a projection overhanging forwardly of said frame back portion and extending across said sight line;

a lens unit carried by said eyepiece projection and located on said sight line, said lens unit comprising a parabolic reflective surface facing said slide stage; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

40. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

a mirror assembly rotatably supported in said frame;

said frame having a side opening, and further apertured whereby light received through said side opening may be reflected by said mirror assembly to illuminate slides received on said stage;

a light source associated with said frame and directed through said opening at said mirror assembly;

a bracket supporting said light source from said frame, said bracket comprising means for releasably securing said light source in different desired positions of angular adjustment;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

41. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

self-powered means supported within said frame for artificially illuminating said slide stage;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

42. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

self-powered means supported within said frame for artificially illuminating said slide stage, said self-powered, artifically illuminating means comprising a battery housing, a battery, a bulb, a cover mounting said bulb and engaged over said housing, means resiliently biasing said battery to contact said bulb, and switch means finger-tip manipulable to make-break the circuit between said battery and said cover;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fringe adjustment means.

43. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
self-powered means supported within said frame for artificially illuminating said slide stage, said self-powered, artificially illuminating means comprising a battery housing,
a battery,
a bulb,
a cover mounting said bulb and engaged over said housing,
means resiliently biasing said battery to contact said bulb, and
switch means finger-tip manipulable to make-break the circuit between said battery and said cover;
said housing having notches extending and undercut below said cover, and said switch means comprising
a can interposed between said resiliently biasing means and said battery and having manipulating pins adapted to be pressed and rotated into said notches;
an eyepiece mounted on said frame back portion, said eyepiece having
a projection overhanging forwardly of said frame back portion and extending across said sight line;

a lens unit carried by said eyepiece projection and located on said sight line; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

44. In a microscope of the class described, suitable for recreational and educational use by the youth as well as the adult population, in combination,
a compact, lightweight, unitary frame, said frame comprisng
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
transverse pivot bearing means in said frame;
self-powered means supported on said pivot bearing means for artificially illuminating said specimen slides on said platform;
an eyepiece mounted on said frame back portion, said eyepiece having
a projection overhanging forwardly of said frame back portion and extending across said sight line;

a lens unit carried by said eyepiece projection and located on said sight line; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

45. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along, and for biaxial support of said slide stage by, said guide slide;
transverse pivot bearing means in said frame;
self-powered means supported on said pivot bearing means for artificially illuminating said specimen slides on said platform;
means for rotating said pivot bearing means and thereby angularly positioning said artificially illuminating means;
an eyepiece mounted on said frame back portion, said eyepiece having
a projection overhanging forwardly of said frame back portion and extending across said sight line;

a lens unit carried by said eyepiece projection and located on said sightline; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

46. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

transverse pivot bearing means in said frame;

self-powered means for artificially illuminating said specimen slides on said platform, said self-powered, artificially illuminating means comprising a housing seatable on said transverse pivot bearing means;

an eyepiece mounted on said frame back portion, said eyepiece having a projection overhanging forwardly of said frame back portion and extending across said sight line;

a lens unit carried by said eyepiece projection and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

47. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

transverse pivot bearing means in said frame, said transverse pivot bearing means comprising oppositely extending, annular trunnions;

self-powered means for artificially illuminating said specimen slides on said platform, said self-powered, artificially illuminating means comprising a housing seatable on said transverse pivot bearing means, said housing comprising conformant bearing arms projecting and received over said trunnions;

an eyepiece mounted on said frame back portion, said eyepiece having a projection overhanging forwardly of said frame back portion and extending across said sight line;

a lens unit carried by said eyepiece and located on said sight line; and means associated with said frame and engaging said vertically sliding slide stage for positioning said platform at any desired focal length between said lens unit and said frame base portion, said platform positioning means comprising fine adjustment means oppositely manually manipulable to urge and permit shifting of said slide stage in one and the opposite direction along said guide slide, and resilient means engaged between said slide stage and said frame and biasing said slide stage in opposition to said fine adjustment means.

48. In a microscope of the class described, suitable for recreational and educational use by the youth as well as the adult population, in combination, a compact, lightweight, unitary frame, said frame comprising a supporting base portion and an integral back portion projecting upwardly of said base portion and clear of the microscope sight line;

a vertical guide slide formed on said frame back portion;

a slide stage, said slide stage comprising a transverse platform, means for engaging and holding specimen slides on said platform, and means engaging said slide stage to said guide slide for vertical sliding movement of said slide stage along, and for biaxial support of said slide stage by, said guide slide;

transverse pivot bearing means in said frame;

self-powered means supported on said transverse pivot bearing means for artificially illuminating said specimen slides on said platform;

means for rotating said transverse pivot bearing means and thereby angularly positioning said self-powered, artificially illuminating means;

means for releasably securing said artificially illuminating means in any angular position in which it is placed by the manipulating of said rotating means;

an eyepiece mounted on said frame back portion, said eyepiece having
a projection overhanging forwardly of said frame back portion and extending across said sight line;

a lens unit carried by said eyepiece and located on said sight line; and
means associated with said frame and engaging said vertically sliding slide stage for positioning said platform at any desired focal length between said lens unit and said frame base portion, said platform positioning means comprising
fine adjustment means oppositely manually manipulable to urge and permit shifting of said slide stage in one and the opposite direction along said guide slide, and
resilient means engaged between said slide stage and said frame and biasing said slide stage in opposition to said fine adjustment means.

49. In a microscope of the class described, suitable for recreational and educational use by the youth as well as the adult population, in combination,
a compact, lightweight, unitary frame, said frame comprising
a supporting base portion and
an integral back portion projecting upwardly of said base portion and clear of the microscope sight line;

a vertical guide slide formed on said frame back portion;
a slide stage, said slide stage comprising
a transverse platform,
means for engaging and holding specimen slides on said platform, and
means engaging said slide stage to said guide slide for vertical sliding movement of said slide stage along said guide slide;
an eyepiece mounted on said frame back portion, said eyepiece having
a projection overhanging forwardly of said frame back portion and extending across said sight line;

a lens unit carried by said eyepiece projection and located on said sight line; and
means associated with said frame and engaging said vertically sliding slide stage for positioning said platform at any desired focal length between said lens unit and said frame base portion, said platform positioning means comprising
spring means compressed between said stage and said eyepiece to bias said slide stage downwardly, and manually manipulable means for driving said stage upwardly.

* * * * *